(12) United States Patent
VanBuskirk

(10) Patent No.: US 6,219,644 B1
(45) Date of Patent: Apr. 17, 2001

(54) AUDIO-ONLY USER SPEECH INTERFACE WITH AUDIO TEMPLATE

(75) Inventor: Ronald VanBuskirk, Indiantown, FL (US)

(73) Assignee: International Business Machines Corp., Armonk, NY (US)

(*) Notice: Subject to any disclaimer, the term of this patent is extended or adjusted under 35 U.S.C. 154(b) by 0 days.

(21) Appl. No.: 09/049,738

(22) Filed: Mar. 27, 1998

(51) Int. Cl.[7] .................................................. G10L 15/26
(52) U.S. Cl. ........................... 704/275; 704/270; 704/235
(58) Field of Search .................................... 704/235, 243, 704/275, 270; 369/25; 707/531

(56) References Cited

U.S. PATENT DOCUMENTS

| 5,265,075 | * | 11/1993 | Bergeron et al. ................ 369/25 |
| 5,477,511 | * | 12/1995 | Englehardt ...................... 369/25 |
| 5,875,448 | * | 2/1999 | Boys et al. ..................... 707/531 |
| 5,884,262 | * | 9/1999 | Wise et al. ..................... 704/270 |
| 5,950,167 | * | 9/1999 | Yaker ........................... 704/275 |

OTHER PUBLICATIONS

Stifelman, LJ et al., "Voicenotes: A Speech Interface for a Hand–Held Voice Notetaker," Conference Proceedings on Human Factors in Computing Systems, pp. 179–18, 1993.*

Schindler, E., "The Computer Speech Book", Academic Press, pp. 221–249, 1996.*

* cited by examiner

Primary Examiner—Richemond Dorvil
Assistant Examiner—Angelo Armstrong
(74) Attorney, Agent, or Firm—Akerman Senterfitt

(57) ABSTRACT

A method for enabling dictation into a speech application from an audio-only interface, in accordance with an inventive arrangement, can include the following steps beginning with creating a dictation template with a plurality of named dictation fields and respective audio prompts identifying each of the dictation fields by a respective name. Second, the template can be opened in response to a command spoken through the audio-only interface. Third, a first one of the audio prompts corresponding to a first one of the dictation fields can be transmitted through the audio-only interface. Fourth, dictation can be accepted into the first one of the dictation fields through the audio-only interface. Fifth, a subsequent one of the dictation fields can be opened in response to another command spoken through the audio-only interface. Sixth, a subsequent one of the audio prompts corresponding to the subsequent one of the dictation fields can be transmitted through the audio-only interface. Seventh, dictation can be accepted into the subsequent one of the dictation fields through the audio-only interface. Finally, each of the fifth, sixth and seventh steps can be repeated until the dictation is complete.

7 Claims, 3 Drawing Sheets

AUDIO-ONLY USER SPEECH INTERFACE WITH AUDIO TEMPLATE

BACKGROUND OF THE INVENTION

1. Field of the Invention

This invention relates to the field of dictation interfaces for speech applications, and in particular, to an audio interface for facilitating dictation when no visual interface is available.

2. Description of Related Art

As people begin to use computer speech-to-text dictation applications more and more, one of the most common places for dictation will be in environments where their eyes and hands are otherwise busy. By definition, these users will be unable to receive any visual feedback in an eyes-busy environment. One of the most effective dictation techniques is for the user to first write out a list of points or bullets that the user needs to cover when the user dictates. However, in an eyes-busy, hands-busy environment it can be unwieldy or sometimes even impossible to use a written list of bullets, even if prepared beforehand, as for example when driving a car.

Experience with dictation in these environments suggests that some sort of non-visual prompting mechanism needs to be developed. These environments are extremely important for support because they will be the most useful environments for notes and letters. Given the accuracy rates of today's dictation engines, even under ideal editing conditions, a good typist will always outperform someone dictating. However, when typing is difficult or impossible, dictation can be an extremely productive alternative.

When dictating without a visible interface, the user is unable to tell what template field the user is dictating into, and likely unable to remember all of the fields the user needs to dictate into, for example when dictating into a form.

SUMMARY OF THE INVENTION

The solution to this problem is to provide a list of points or bullets to the person dictating. Because the visual environment is occupied, the next best free input modality is the auditory modality. Therefore, the user can be accommodated by audio prompts that give the user information about the field or section the user is about to dictate into. The audio prompts can be programmed into a document template, in which each field of the document is provided with an audio point or bullet which can be played back as each field or section is sequentially accessed. To the extent the user does remember any of the field or section names, such fields or sections can be accessed directly by a command, for example Go To <fieldname>. The template can also be programmed with an initial audio prompt which identifies the template as well as a final audio prompt which advises the user that the template has been completed and can be saved, if not earlier named.

A method for enabling dictation into a speech application from an audio-only interface, in accordance with an inventive arrangement, can include the following steps beginning with generating a visual user interface for creating a dictation template. The template preferably has a plurality of named dictation fields and respective audio prompts identifying each of the dictation fields by a respective name. Second, the template can be opened in response to a command spoken through the audio-only interface. Third, a first one of the audio prompts corresponding to a first one of the dictation fields can be transmitted through the audio-only interface. Fourth, dictation can be accepted into the first one of the dictation fields through the audio-only interface. Fifth, a subsequent one of the dictation fields can be opened in response to another command spoken through the audio-only interface. Sixth, a subsequent one of the audio prompts corresponding to the subsequent one of the dictation fields can be transmitted through the audio-only interface. Seventh, dictation can be accepted into the subsequent one of the dictation fields through the audio-only interface. Finally, each of the fifth, sixth and seventh steps can be repeated until the dictation is complete. In this way, a user can dictate into the dictation fields without seeing or remembering the names of the dictation fields.

The dictation fields are advantageously accessible in a predetermined sequence without being identified by name in the spoken commands. The dictation fields are also advantageously accessible when identified by name in the spoken commands.

An audio template for enabling dictation into a speech application from an audio-only interface, in accordance with another inventive arrangement, can include a plurality of named dictation fields and respective audio prompts identifying each of the dictation fields by a respective name. The audio template can be openable in response to a command spoken through the audio-only interface. Moreover, each of the dictation fields can be openable in response to a spoken command transmitted through the audio-only interface. Finally, each of the respective audio prompts can be automatically transmittable through the audio-only interface in response to the dictation fields being opened. In this way, a user can dictate into the dictation fields without seeing or remembering the names of the dictation fields.

The dictation fields are advantageously accessible in a predetermined sequence without being identified by name in the spoken commands. The dictation fields are also advantageously accessible when identified by name in the spoken commands.

DETAILED DESCRIPTION OF THE PREFERRED EMBODIMENTS

Figure 1:
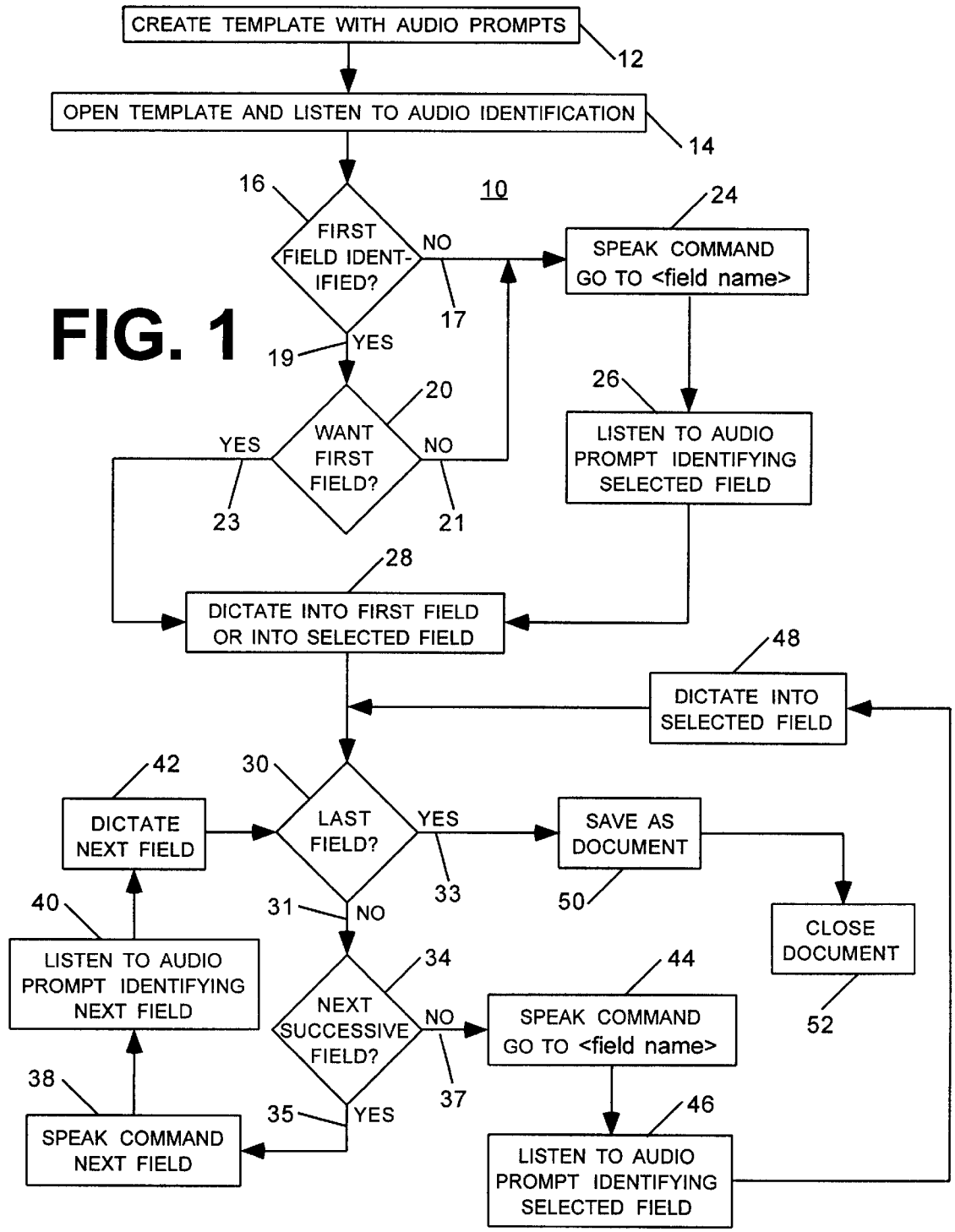
FIG. 1 is a flow chart illustrating a method for using an audio-only user interface in accordance with the inventive arrangements.

A flow chart illustrating a method 10 for using an audio speech user interface in accordance with the inventive arrangements is shown in FIG. 1. Such a method is advantageously utilized in any dictation environment in which a visual user interface is not available. Such environments can include, for example, dictating while in a car or dictating while inspecting a property or dictating while taking a walk. The method presumes that the user has a portable work station but is unable to view the display, or the user has available a portable wireless link to a work station or a telephone link to a work station, and that the work station has a speech application running therein, together with a communications application. The portable wireless link can be implemented, for example, by a cellular phone.

The first step in the method 10 is to create a template with audio prompts, which can be accessed remotely. The audio prompts in the template would identify each field or section into which the user may want to dictate different parts or aspects of a document, for example a form. The audio prompts also advantageously include the name of the template, so that the user can receive confirmation that the correct template has been remotely accessed. In that regard, in accordance with the step of block 14, the user opens the template with an appropriate spoken command and listens to the audio identification. If the template is correctly identified, the user moves to decision block 16. If not, the user must close the wrong template and open the correct template. This decision step has been omitted from the flow chart for purposes of simplification. Absent a name prompt, the user cannot confirm that the correct template has been opened until a field in the template has been identified which the user recognizes as being appropriate.

Even if the template is properly identified, whether or not the first field is then automatically identified and accessed for dictation depends on the manner in which the template was programmed.

In accordance with the step of decision block 16, the user must perceive from the first audio prompt in block 14 whether the first field has also been identified. If the answer is yes, the method branches on path 19 to decision block 20. In accordance with the decision step of block 20, the user must decide if the user wants to dictate into the first field. If the user wants to dictate into the first field, the method branches on path 23 to block 28.

If the first field has not been identified in the step of decision block 16, or if the first field is identified, but the user decides not to dictate into the first field in the step of decision block 20, the method branches on paths 17 and 21 respectively to block 24. In accordance with the step of block 24, the user can speak a command to GO TO the first field or any other field. It will be appreciated that for the user to directly access different fields, the user must remember the names of those fields. If the user does not remember the names of any of the fields, the user can step through all of the fields sequentially, as will become apparent.

If the user accesses the first field or another field in accordance with the step of block 24, the user then listens to the audio prompt identifying the selected field in accordance with the step of block 26. Thereafter, the method moves to block 28. If the user wanted to dictate into the first field in accordance with the decision step of block 20, as noted above, path 23 also leads to block 28. In accordance with the step of block 28, the user dictates into the first field or into the selected field, as appropriate.

After dictating into the first or a selected field, the method moves to decision block 30, in accordance with which the user decides whether the field dictated into in accordance with the step of block 28 is the last field to be dictated. If not, the method branches onto path 31, which leads to decision block 34. In decision block 34, the user decides whether or not to move to the next sequential field. If so, the method branches on path 35 to block 38, in accordance with which the user speaks the command for the next field, for example, NEXT FIELD.

The user then listens for the audio prompt for the next field in accordance with the step of block 40, and thereafter, dictates into the next field in accordance with the step of block 42. The user can then continue in the loop including decision block 30, path 31, decision block 34, path 35, block 38, block 40, block 42 and back to decision block 30 until all of the fields have been accessed and dictated into.

At any time the user reaches decision block 34, the user can choose to dictate into a selected field by branching onto path 37 to the step of block 44, in accordance with which the user speaks the command to GO TO a named field. The user then listens for the audio prompt for the selected field in accordance with the step of block 46, and thereafter, dictates into the selected field in accordance with the step of block 48. The user can then use the loop including decision block 30, path 31, decision block 34, path 37, block 44, block 46, block 48 and back to decision block 30 each time the user wants to dictate into a field other than the next sequential field, provided of course the user remembers the name of the field.

Eventually, the user will have dictated into the last field, and in accordance with the decision step of block 30, will branch on path 33 to block 50. In accordance with the step of block 50, if the user has not already saved the template as a named document, the user saves the template as a named document, and thereafter, closes the document in accordance with the step of block 52.

Figure 2:
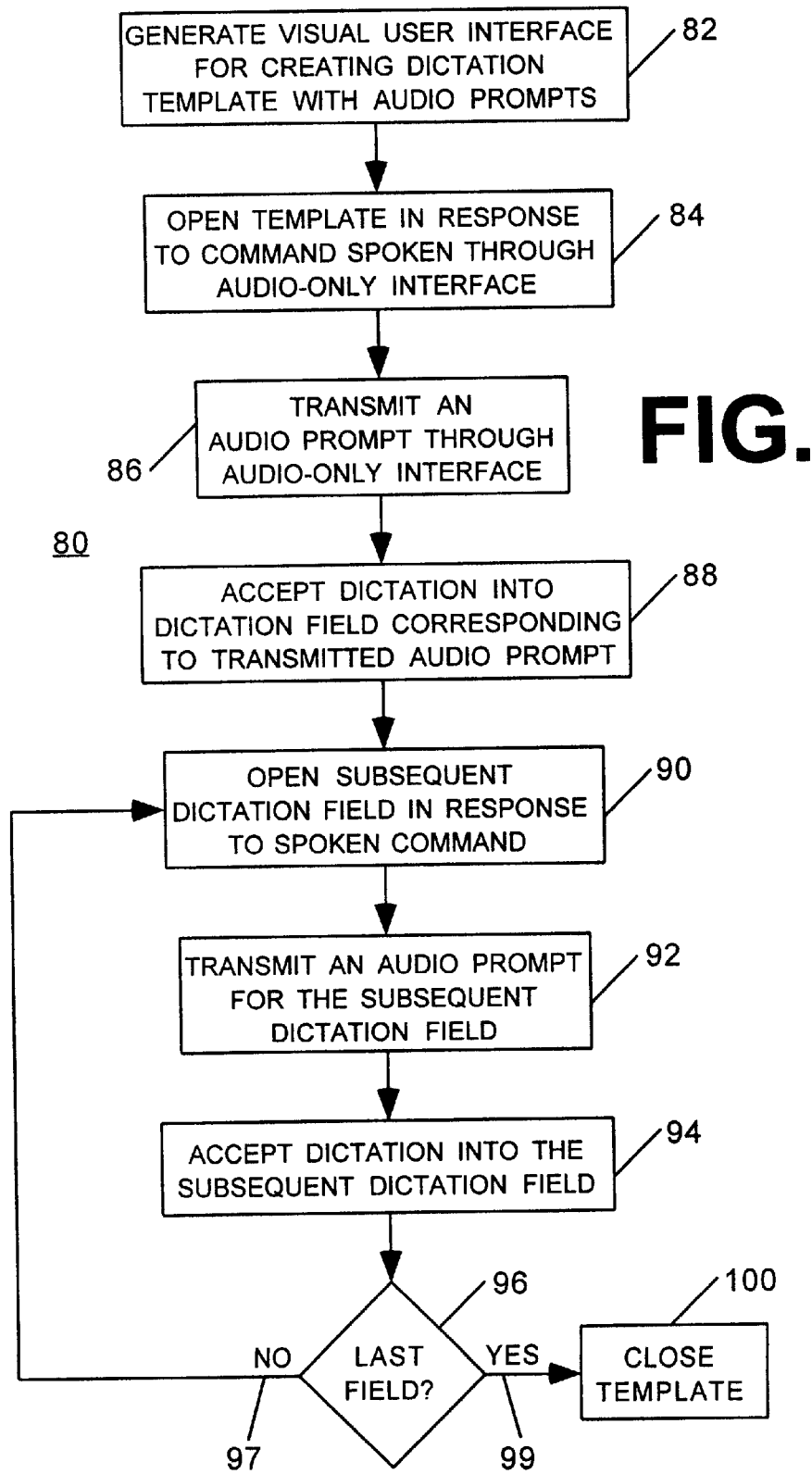
FIG. 2 is a flow chart illustrating a method for implementing the audio-only user interface in accordance with the inventive arrangements.

A flow chart illustrating a method 80 for implementing the audio-only user interface in accordance with the inventive arrangements is shown in FIG. 2. In accordance with the first step of block 82, a visual interface is generated for creating a dictation template with audio prompts.

The audio template is opened in accordance with the step of block 84 in response to a command spoken through the audio-only interface. An audio prompt is transmitted through the audio-only interface in accordance with the step of block 86 and dictation is accepted into the dictation field corresponding to the transmitted audio prompt of block 86 in accordance with the step of block 88.

A subsequent dictation field is opened in accordance with the step of block 90, in response to a command spoken through the audio-only interface. An audio prompt for the subsequent field is transmitted through the audio-only interface in accordance with the step of block 92, and dictation is accepted into the subsequent dictation field corresponding to the transmitted audio prompt of block 92 in accordance with the step of block 94.

If the last dictation field has been dictated into in accordance with the decision step of block 96, the method branches on path 97 back to the step of block 90. A loop including blocks 90, 92, 94, 96 and path 97 continues until the last dictation field has been dictated into in accordance with the decision step of block 96. At this point, the method branches on path 99 to the step of block 100, in accordance with which the audio template is closed, and if necessary, saved.

The power of the inventive arrangements can be appreciated by comparing the manner in which the relatively simple implementation method 80 shown in FIG. 2 can advantageously accommodate the numerous decision paths and loops of the user method 10 shown in FIG. 1, which due to the vagaries of individual preferences and circumstances, can not be predicted with certainty.

It will be appreciated with respect to both the user and implementation methods that various editing commands will be available to the user during the dictating steps, as would be available when using a visual interface. It would be necessary for the user to remember the commands, or alternatively, the speech application would enable the user to open an audio instruction template having lists of various categories of edit and file commands, in the nature of audio help files.

Figure 3:
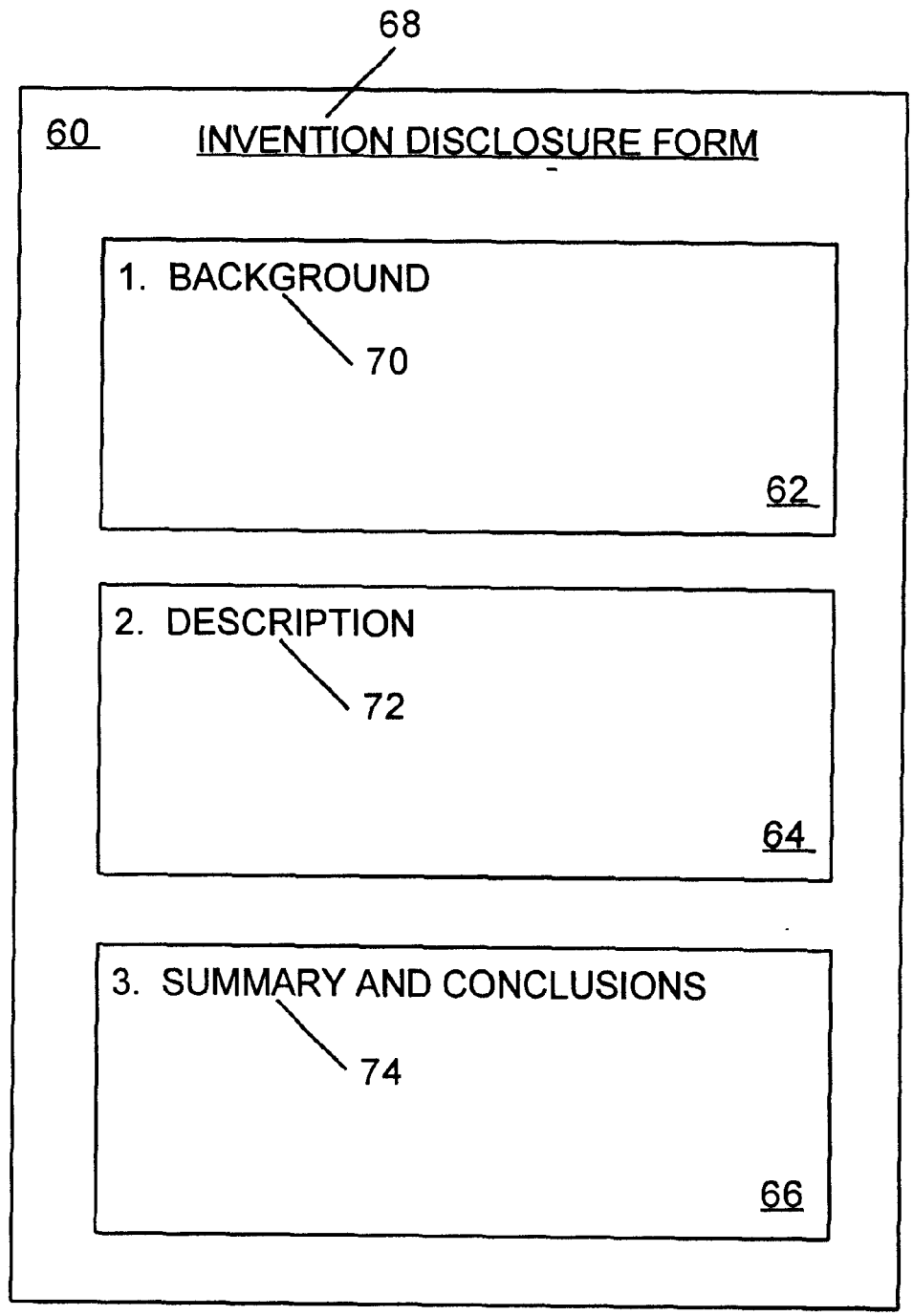
FIG. 3 is a diagram useful for explaining an audio template in accordance with the inventive arrangements.

An audio template 60 in accordance with the inventive arrangements is shown in FIG. 3. The template 60 is a simple invention disclosure form having a title 68, a background field or section 62, a description field or section 64 and a summary and conclusions field or section 66. Field 62 has a title 70, field 64 has a title 72 and field 66 has a title 74. When the template 60 is opened responsive to a command spoken through the audio-only interface, the title 68 of the form can be converted from text to speech and transmitted to the user as an audio prompt. The title 70 of field 62 can also be converted from text to speech and transmitted to the user as an audio prompt. Transmission of the audio prompt of title 70 opens the dictation field 62, which remains open until the user speaks a command to go to the next successive or subsequent field, or another field. Dictation fields are opened, dictated into, and closed until all dictation fields have been accessed, or the user otherwise terminates dictation.

The audio prompt for the last dictation field can advantageously identify that field as the last field. Alternatively, closing the last field can initiate a final audio prompt that the template has been completed, and can be saved by name.

The creation and use of audio templates in accordance with the inventive arrangements enable users for the first time to efficiently dictate into a speech application from sites remote from the work station or network on which the speech application resides.

What is claimed is:

1. A method for enabling dictation into a speech application from an audio-only interface, comprising the steps of:
   (a) generating a visual user interface for creating an audio template with a plurality of programmable named dictation fields and respective audio prompts identifying each of said programmable dictation fields by a respective name;
   (b) opening said audio template in response to a command spoken through said audio-only interface;
   (c) accepting a command specifying a dictation field name, said command spoken through said audio-only interface;
   (d) accessing a dictation field in said audio template, said dictation field corresponding to said specified dictation field name;
   (e) transmitting through said audio-only interface an audio prompt corresponding to said accessed dictation field; and,
   (f) accepting dictated speech through said audio-only interface, converting said dictated speech into text, and inserting said text into said accessed dictation field.

2. The method of claim 1, further comprising the steps of:
   (g) opening a subsequent one of said dictation fields in response to another command spoken through said audio-only interface;
   (h) transmitting through said audio-only interface a subsequent one of said audio prompts corresponding to said subsequent one of said dictation fields;
   (i) accepting dictated speech, converting said dictated speech into text, and inserting said text into said subsequent one of said dictation fields through said audio-only interface; and,
   (j) repeating said steps (g), (h) and (i) until said dictation is complete.

3. The method of claim 2, wherein said step of opening a subsequent one of said dictation fields comprises the steps of:

accepting a command spoken through said audio-only interface;

speech recognizing in said command a specific field name; and, opening a dictation field corresponding to said recognized field name.

4. An audio template for enabling dictation into a speech application from an audio-only interface, comprising:
   a plurality of programmable named dictation fields;
   respective audio prompts identifying through said audio-only interface each of said programmable dictation fields by a respective programmable name; and,
   means for accepting speech-to-text converted dictated speech through said audio-only interface into said dictation fields;
   said audio template being openable in response to a command spoken through said audio-only interface;
   each of said dictation fields being openable in response to a spoken command specifying a respective programmable name, said spoken command transmitted through said audio-only interface;
   each of said respective audio prompts being automatically transmittable through said audio-only interface in response to said dictation fields being opened.

5. The audio template according to claim 4, wherein each of said programmable dictation fields are selectable and openable in response to a spoken command identifying said programmable dictation fields by field name.

6. The audio template according to claim 4, further comprising:
   means for accepting a command spoken through said audio-only interface wherein said command selects a dictation field and includes a corresponding field name;
   means for speech recognizing in said command said field name; and,
   means for opening said selected dictation field corresponding to said recognized field name.

7. An audio template comprising:
   a plurality of user-programmable dictation fields, said user-programmable fields configured to accept dictated text;
   a plurality of user-programmable dictation field names, each said dictation field name associated with at least one of said dictation fields;
   a plurality of audio prompts, each said audio prompt associated with at least one of said dictation fields, each said audio prompt identifying said corresponding dictation field;
   said dictation fields accessible through an audio-only user interface;
   said dictation fields accessible by audibly specifying said associated dictation field name in a spoken command provided through said audio-only user interface;
   said dictation fields further accessible sequentially by audibly specifying in a spoken command provided through said audio-only user interface a preference to dictate text in a next sequential dictation field; and,
   for each dictation field accessed responsive to a spoken command, said audio template outputting an audio prompt associated with said accessed dictation field.

* * * * *